Aug. 14, 1928.

T. F. CONNOLLY ET AL

RAT TRAP

Filed Jan. 19, 1927

Inventor
Lloyd Randle
Thomas F. Connolly

By Herbert E. Smith
Attorney

Patented Aug. 14, 1928.

1,680,594

UNITED STATES PATENT OFFICE.

THOMAS F. CONNOLLY AND LLOYD RANDLE, OF COLFAX, WASHINGTON; SAID LLOYD RANDLE ASSIGNOR TO CLARENCE E. RANDLE, OF PULLMAN, WASHINGTON.

RAT TRAP.

Application filed January 19, 1927. Serial No. 162,149.

Our present invention relates to improvements in rat traps of the type in which the rodent is electrocuted by coming in contact with two spaced electrodes. The primary object of the invention is to provide a device of this character that is simple in construction and operation, comparatively inexpensive in cost of production, and which will be reliable in the performance of its functions. To this end the invention contemplates the use of spaced upper and lower electrodes between which the rodent is baited to enter, and by contact with which electrodes he is electrocuted. The electrodes are arranged in such manner that escape for the rodent is practically impossible and its electrocution is sure and speedy.

The invention consists in certain novel combinations and arrangements of parts as will hereinafter be more fully set forth and claimed. In the accompanying drawings we have illustrated one complete example of the physical embodiment of our invention wherein the parts are combined and arranged according to the best mode we have thus far devised for the practical application of the principles of our invention.

Figure 1:
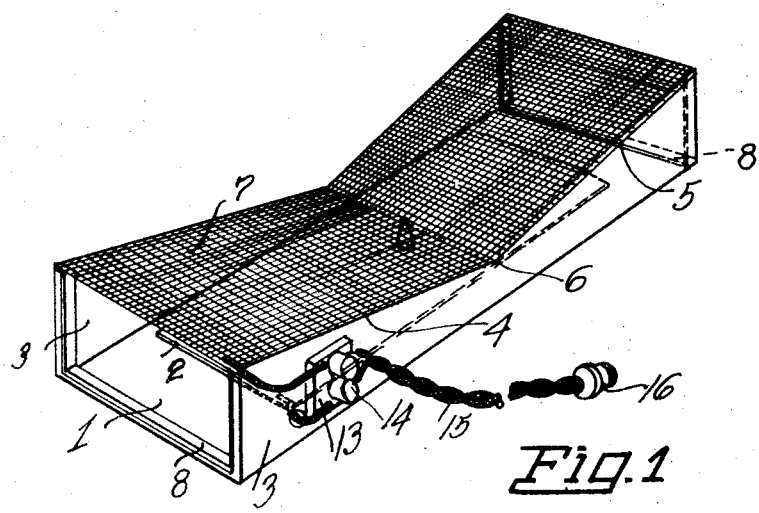
Figure 1 is a perspective view embodying our invention, showing the electrical connections.

In the preferred form of the invention as illustrated in the drawings an open end structure, is used for the trap comprising a bottom board 1 of insulating material upon the upper face of which a metallic plate 2 is secured. This plate is a good conductor of electricity and is used as the bottom or lower electrode for the rodent. The ends of the plate terminate short of the ends of the bottom board of the trap to insure safety in handling the trap when the current is turned on, and the plate it will be apparent is designed to be walked upon by the rodent.

The opened end trap is fashioned with side walls 3, 3, also of insulating or non-conducting material, and the top edges of the side walls are especially formed as at 4 and 5 to decline from the respective ends of the trap toward the center 6 which is the lowest point of each of the top edges.

The top of the trap is fashioned of metallic wire fabric or wire mesh indicated as 7, the side edges of the top being secured to the declining edges of the side walls of the trap.

The opposite ends of the top are secured to end frames 8 of metal that is a good conductor of electricity, and the inclined top of the trap is utilized as an upper electrode for electrocuting the rodent in combination with the lower electrode or plate 2.

Figure 2:
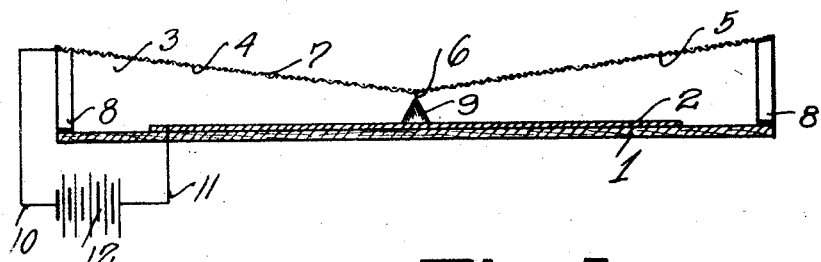
Figure 2 is a longitudinal, vertical sectional view of the device of our invention, showing the electrical connections in a diagrammatic way.

In Figure 2 the electric circuit is indicated in conventional form by wires 10 and 11 connected respectively to the upper and lower electrodes, and a battery 12 is indicated as a source of energy.

In the form of the invention as we have successfully operated it and placed it on the market for sale we use an outside plate 13 with safety fuses 14 interposed between the wires 10 and 11 and the flexible cord or cables 15. These cords or wires are connected to the plug 16 and the plug may be inserted in a socket of a house wiring system, said socket being either in the floor or in the wall as customary.

A bait is indicated by the numeral 9 at the longitudinal and transverse center of the base plate 2, and this may be of any suitable nature that will attract the rodent thereto from either open end of the trap. As the rodent enters from either end and places its forepaws on the plate 2, if it at the same time places any part of its body in contact with a frame 8, it receives a shock. Or, with its forepaws on the plate 2, if its back rubs against the declining top, a shock will be given the rodent causing it to jump forward and become wedged between the declining top of the trap and the base plate, thus insuring its electrocution.

When the plug 16 has been disconnected from its socket the electrocuted rodent may be displaced from the trap, and the latter cleansed or fumigated if necessary, after which it is again ready for use.

Having thus fully described our invention what we claim as new and desire to secure by Letters Patent is—

The combination with a bottom having a bottom plate, and side walls having upper edges declining from the respective ends toward the longitudinal centers of said walls, of a reticulated top having its opposite edges secured to said declining edges, and electrical connections to said bottom plate and top for the purpose described.

In testimony whereof we affix our signatures.

THOMAS F. CONNOLLY.
LLOYD RANDLE.